United States Patent
Jeung et al.

(10) Patent No.: US 8,972,174 B2
(45) Date of Patent: Mar. 3, 2015

(54) METHOD FOR PROVIDING NAVIGATION INFORMATION, MACHINE-READABLE STORAGE MEDIUM, MOBILE TERMINAL, AND SERVER

(71) Applicant: Samsung Electronics Co. Ltd., Suwon-si (KR)

(72) Inventors: Ji-Hong Jeung, Seoul (KR); Kyu-Sung Cho, Suwon-si (KR); Sung-Hwan Baek, Suwon-si (KR); Ik-Hwan Cho, Suwon-si (KR); Tae-Hwan Son, Suwon-si (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 0 days.

(21) Appl. No.: 13/909,788

(22) Filed: Jun. 4, 2013

(65) Prior Publication Data

US 2013/0332066 A1 Dec. 12, 2013

(30) Foreign Application Priority Data

Jun. 6, 2012 (KR) ........................ 10-2012-0060679

(51) Int. Cl.
*G01C 21/34* (2006.01)
*G01C 21/36* (2006.01)
*G06T 11/00* (2006.01)

(52) U.S. Cl.
CPC ............ *G01C 21/34* (2013.01); *G01C 21/3602* (2013.01); *G06T 11/00* (2013.01)
USPC ......................................................... 701/420

(58) Field of Classification Search
CPC ........ G01C 21/34; G01C 21/00; G01C 21/30; G01C 21/3605; G01C 21/3679; G01C 21/3682
USPC .................................................... 701/42, 420
See application file for complete search history.

(56) References Cited

U.S. PATENT DOCUMENTS

2008/0051991 A1* 2/2008 Lee et al. ...................... 701/209
2011/0053615 A1* 3/2011 Lee ................................ 455/457
2011/0313653 A1* 12/2011 Lindner ........................ 701/201

FOREIGN PATENT DOCUMENTS

KR 10-2011-0114114 A 10/2011

* cited by examiner

*Primary Examiner* — Mary Cheung
*Assistant Examiner* — Anne Mazzara
(74) *Attorney, Agent, or Firm* — Jefferson IP Law, LLP

(57) ABSTRACT

A method for providing navigation information, a machine-readable storage medium, a mobile terminal and a server are provided. The method includes generating a preview image captured by a camera and location information of the mobile terminal; transmitting the preview image and location information to a server, receiving, from the server, route guide information generated based on the preview image and the location information, and displaying the route guide information to a user.

19 Claims, 8 Drawing Sheets

METHOD FOR PROVIDING NAVIGATION INFORMATION, MACHINE-READABLE STORAGE MEDIUM, MOBILE TERMINAL, AND SERVER

PRIORITY

This application claims the benefit under 35 U.S.C. §119(a) of a Korean Patent Application filed on Jun. 6, 2012 in the Korean Intellectual Property Office and assigned Serial No. 10-2012-0060679, the entire disclosure of which is hereby incorporated by reference.

BACKGROUND OF THE INVENTION

1. Field of the Invention

The present invention relates to a method for providing navigation information. More particularly, the present invention relates to a method for providing navigation information to a mobile terminal by using an Augmented Reality (AR) technology.

2. Description of the Related Art

A navigation receiver receives signals transmitted by navigation transmitters (e.g., satellites, also known as space vehicles) within a navigation network. Thereafter, the received signals are processed in order to display a location. The navigation receiver may be a dedicated device, or may be a device, which includes other functions as well as a navigation function, such as a mobile handset for a cellular wireless system.

The Global Positioning System (GPS) and the GLObal NAvigation Satellite System (GLONASS or Glonass) are examples of satellite navigation systems which can typically provide location information as well as velocity and time information. Other satellite navigation systems include the European Galileo system, the Indian Regional Navigation Satellite System (IRNSS), and the Compass & Beidou satellite navigation systems. Generally, these systems are referred to as Global Navigation Satellite Systems (GNSS).

In addition, non-satellite navigation systems are known. Pseudolite navigation systems are ground-based alternatives to satellite navigation systems. Other terrestrial navigation systems such as LOng RAnge Navigation (LORAN) are also known along with systems in which cellular wireless network access nodes are used as navigation transmitters and other systems in which Wi-Fi network access points are used as navigation transmitters.

AR navigation implies that a user is helped to easily and naturally recognize a route, along which the user intends to travel, in such a manner as to identify a Point Of Interest (POI) and to generate the route to match a preview image or a street view image, which has been captured by a camera.

However, when a navigation method of the related art is applied to the AR navigation without any change, a route guide object does not accurately match the preview image, but seems to be floating on the road. Therefore, a problem arises in that there may occur a case in which the user is guided to an incorrect road in a complicated downtown area.

Therefore, a need exists for an apparatus and method for providing a user with a stable and useful AR navigation on a mobile terminal. For example, a need exists for a system which uses a camera preview mixed with a street view when providing AR navigation to a user on a mobile terminal.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a user with an AR navigation system which uses a camera preview mixed with a street view, so as to enable a user to experience the use of stable and useful AR navigation on a mobile terminal.

In accordance with an aspect of the present invention, a method for providing navigation information to a mobile terminal is provided. The method includes generating a preview image captured by a camera and location information of the mobile terminal, transmitting the preview image and location information to a server; receiving, from the server, route guide information generated based on the preview image and the location information, and displaying the route guide information to a user.

In accordance with another aspect of the present invention, a method for providing navigation information by a server is provided. The method includes receiving, from the mobile terminal, a preview image captured by the mobile terminal and location information of the mobile terminal, matching the preview image with a pre-stored street view image, generating route guide information based on location and direction information related to the matched street view image, and transmitting the route guide information to the mobile terminal.

In accordance with another aspect of the present invention, a mobile terminal for navigation is provided. The mobile terminal includes a camera which captures a preview image, a sensor unit which generates location information of the mobile terminal, a communication unit which transmits the preview image and the location information to a server, and a controller which controls the communication unit to receive route guide information generated based on the preview image and the location information from the server, and which controls a display unit to display the route guide information to a user.

In accordance with another aspect of the present invention, a server which provides navigation information to a mobile terminal is provided. The server includes a communication unit which receives, from the mobile terminal, a preview image captured by the mobile terminal and location information of the mobile terminal, a memory which stores street view images, and a controller which searches for a street view image matching the preview image from the street view images, which generates route guide information based on location and direction information related to the matched street view image, and which controls the communication unit to transmit the route guide information to the mobile terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
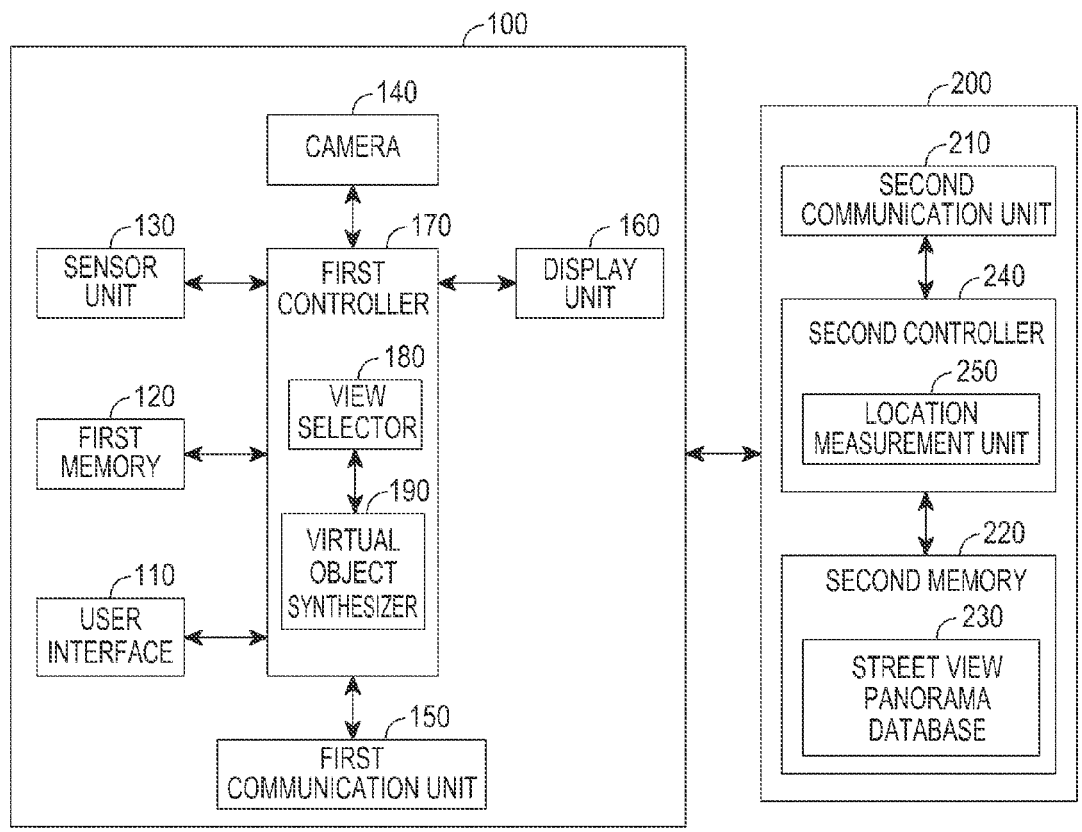
FIG. 1 is a block diagram illustrating a configuration of a navigation system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the terms including ordinal numbers such as first and second may be used herein to describe various elements, these elements should not be limited by these terms. These terms are only used to distinguish one element from another. For example, a first element could be termed a second element, and similarly, a second element could be termed a first element, without departing from the scope of right of the present invention. As used here, the term "and/or" includes any and all combinations of one or more of the associated listed items.

It will be understood that when an element is referred to as being "connected" or "coupled" to another element, the element can be directly connected or coupled to the other element or intervening elements may be present. In contrast, it will be understood that when an element is referred to as being "directly connected" or "directly coupled" to another element, there are no intervening elements present.

The terminology used herein is merely used to describe particular exemplary embodiments of the present invention, and is not intended to limit the present invention. As used herein, the singular forms "a," "an" and "the" are intended to include the plural forms as well, unless the context clearly indicates otherwise. In the present specification, it is to be understood that the terms "comprising," "including" or "having" are intended to indicate the existence of the features, numbers, steps, operations, elements, parts, or combinations thereof disclosed in the specification, and are not intended to preclude the possibility that one or more other features, numbers, steps, operations, elements, parts, or combinations thereof may exist or may be added.

Unless otherwise defined, all terms (including technical and scientific terms) used herein have the same meaning as commonly understood by those having ordinary knowledge in the technical field, to which the present invention pertains. Terms, such as those defined in commonly used dictionaries, should be interpreted as having a meaning that is consistent with their meaning in the context of the relevant art, and will not be interpreted in an idealized or overly formal sense unless expressly so defined herein.

FIG. 1 is a block diagram illustrating a configuration of a navigation system according to an exemplary embodiment of the present invention.

Referring to FIG. 1, the navigation system includes a mobile terminal 100 and a server 200.

The mobile terminal 100 includes a user interface 110, a first memory 120, a sensor unit 130, a camera 140, a first communication unit 150, a display unit 160, and a first controller 170.

The mobile terminal 100 may communicate with an external device, or may perform a task in association with the external device. For example, the mobile terminal 100 may transmit an image captured by the camera 140 and/or position information detected by the sensor unit 130 to the server 200 via a network. The network is not limited to this configuration, and thus may include at least one of a Local Area Network (LAN), a Wireless Local Area Network (WLAN), a Wide Area Network (WAN), an Internet, a Small Area Network (SAN), and the like.

The mobile terminal 100 may be an optional device having a navigation function, and may be a smart phone, a mobile phone, a navigation device, a video game console, a display device, a head unit for a vehicle, a laptop computer, a tablet Personal Computer (PC), a Personal Media Player (PMP), a Personal Digital Assistant (PDA), a handheld e-book, an MP3 player, a digital camera, a portable game console, and the like. The mobile terminal 100 may be implemented as a portable communication terminal having a wireless communication function.

The user interface 110 which is a means for receiving user input or notifying a user of information, may include multiple buttons, a microphone, a speaker, a vibration motor, a connector, a keypad, and/or the like. Examples of the user interfaces 110 are not limited to this configuration. Accordingly, cursor control, such as a mouse, a trackball, a joystick or cursor direction keys, may be provided to the user interface 110 in order to transmit and receive information to/from the first controller 170 and in order to control the movement of a cursor on a screen of the display unit 160.

The buttons may be formed on a front surface, a lateral surface or a rear surface of the mobile terminal 100, and may include a power/lock button (not shown), a volume button (not shown), a menu button, a home button, a back button, a search button, and the like.

According to the control of the first controller 170, the microphone receives a voice or sound as input, and generates an electrical signal.

According to the control of the first controller 170, the speaker may output sounds corresponding to various signals (e.g., a wireless signal, a broadcast signal, a digital audio file, a digital moving image file, and photographing) to the outside of the mobile terminal 100. The speaker may output a sound corresponding to a function that the mobile terminal 100 performs. One speaker or multiple speakers may be disposed at an appropriate position or appropriate positions of the mobile terminal 100.

According to the control of the first controller 170, the vibration motor may convert an electrical signal into a mechanical vibration. For example, when the mobile terminal 100 in a vibration mode receives a voice call from another device (not shown), the vibration motor of the mobile terminal 100 operates. One vibration motor or multiple vibration motors may be mounted within the mobile terminal 100. The vibration motor may operate in response to a touch action of the user who touches a touch screen and a continuous movement of a touch on the touch screen.

A connector may be used as an interface for connecting the mobile terminal 100 to the server, an external device, or a power source (not shown). According to the control of the first controller 170, through a wired cable connected to the connector, data stored in the first memory 120 of the mobile terminal 100 may be transmitted to the external device or data may be received from the external device. Through the wired cable connected to the connector, power may be supplied by the power source or a battery may be charged.

The keypad may receive key input from the user in order to control the mobile terminal 100. The keypad includes a physical keypad installed on the mobile terminal 100 or a virtual keypad displayed on the display unit (e.g., a touch screen).

The sensor unit 130 includes at least one sensor for detecting the state (e.g., location, bearing, direction, movement, and the like) of the mobile terminal 100. For example, the sensor unit 130 may include a proximity sensor for detecting whether the user is close to the mobile terminal 100, and a motion/bearing/direction sensor for detecting motions of the mobile terminal 100 (e.g., the rotation, acceleration, deceleration, vibration, direction, bearing, and the like of the mobile terminal 100). In addition, the motion/bearing/direction sensor may include an acceleration sensor, a gravity sensor, a terrestrial magnetism sensor, a gyro sensor, a shock sensor, a Global Positioning System (GPS) sensor, a compass sensor, and/or the like. The sensor unit 130 may detect the state of the mobile terminal 100, may generate a signal corresponding to the detection, and may transmit the generated signal to the first controller 170. For example, the GPS sensor receives a radio wave from each of multiple GPS satellites (not shown) in the Earth's orbit, and may calculate a location of the mobile terminal 100 by using a Time of Arrival (TOA) from each of the GPS satellites (not shown) to the mobile terminal 100. The compass sensor calculates an attitude, a bearing or a direction of the mobile terminal 100.

The first communication unit 150 is provided in order to be directly connected to a server or an external device, or in order to be connected to the server or external device via a network. The first communication unit 150 may be a wired or wireless communication unit. The first communication unit 150 transmits data from the first controller 170, the first memory 120, the camera 140 or the like, by a wire or wirelessly. Otherwise, the first communication unit 150 receives, by a wire, data from an external communication line, or wirelessly receives data transmitted over the air, and delivers the received data to the first controller 170, or stores the received data in the first memory 120.

According to performance of the mobile terminal 100, the first communication unit 150 may include at least one of a mobile communication module, a wireless LAN module and a short-range communication module. The first communication unit 150 is not limited to this configuration. Accordingly, examples of the first communication units 150 may include an Integrated Services Digital Network (ISDN) card, a modem, an LAN card, an Infrared port, a Bluetooth port, a Zigbee port, a wireless port, and the like.

According to the control of the first controller 170, the mobile communication module allows the mobile terminal 100 to be connected to an external device through mobile communication by using at least one antenna (not shown). The mobile communication module transmits and receives a wireless signal for the exchange of data, or unidirectional transmission or reception of data, such as a voice call, a video call, a Short Message Service (SMS) or a Multimedia Messaging Service (MMS), to/from a mobile phone (not shown), a smart phone (not shown), a tablet PC or another device (not shown), which has a telephone number or a network address, which is input to the mobile terminal 100.

According to the control of the first controller 170, the wireless LAN module may be connected to the Internet at a place at which a wireless Access Point (AP) (not shown) is installed. The wireless LAN module supports a wireless Local Area Network (LAN) standard (IEEE802.11x) of the Institute of Electrical and Electronics Engineers (IEEE). According to the control of the first controller 170, the short-range communication module enables the mobile terminal 100 to perform short-range wireless communication with an image forming device (not shown). Short-range communication schemes may include Bluetooth, Infrared Data Association (IrDA), and the like.

The camera 140 may include a lens system, a driving unit and an image sensor. The camera 140 may further include a flash. The camera 140 converts a light signal, which is input (or captured) through the lens system, into an electrical image signal or image data, and outputs the electrical image signal or image data. The user may capture a moving image or a still image through the camera 140. In other words, the camera 140 forms an optical image of the subject, and detects the formed optical image as an electrical signal.

The lens system forms an image of the subject by causing light incident from the outside to converge. The lens system includes at least one lens, and lenses may be a convex lens, an aspheric lens, and the like. The lens system has symmetry with respect to an optical axis passing through the center of the lens system, and the optical axis is defined as a central axis. The image sensor detects an optical image formed by external light incident through the lens system, as an electrical image signal.

The image sensor includes multiple pixels arranged in the structure of an M×N matrix, and the pixel may include a photo diode and at least one transistor. The pixel accumulates charges generated by incident light (namely, an exposure process), and a voltage according to the accumulated charges represents the illuminance of the incident light (namely, a process for outputting image data). In the case of processing a still image or one image included in a moving image file, image data which is output from the image sensor is formed by a set of voltages (namely, pixel values) which are output from the pixels, and the image data represents one image (namely, a still image). Also, the image includes M×N pixels. The image sensor may be a Charge-Coupled Device (CCD) image sensor, a Complementary Metal-Oxide Semiconductor (CMOS) image sensor, and/or the like.

The driving unit drives the image sensor according to the control of the first controller 170. According to a control signal received from the first controller 170, the driving unit exposes all pixels of the image sensor or only within a region of interest among all the pixels, and causes image data which is output from the pixels, to be output to the first controller 170.

The first controller 170 processes an image received from the camera unit 140, or an image stored in the first memory 120, on a frame-by-frame basis, and outputs an image frame which is converted to meet the characteristics (e.g., size, image quality, resolution, and the like) of the screen of the display unit 160.

The display unit 160 displays an image, which has been input from the first controller 170, on a screen thereof. The display unit 160 may be implemented by a Liquid Crystal Display (LCD) and/or the like. The display unit 160 may be configured as a touch screen. The touch screen displays an image according to the control of the first controller 170. When a user input means (e.g., a finger or a stylus pen) touches the surface of the touch screen, the touch screen generates a key touch interrupt, and outputs user input information, which includes input coordinates and an input state, to the first controller 170, according to the control of the first controller 170.

The touch screen may provide the user with a graphical user interface corresponding to various services (e.g., telephone call, data transmission, broadcasting, and capturing of a still image/a moving image). The touch screen may transmit user input information corresponding to at least one touch, which is input to the graphical user interface, to the first controller 170. The touch screen may receive at least one touch as input through the user's body (e.g., fingers including thumbs) or an input means (e.g., a stylus pen) enabling a touch. In addition, the touch screen may receive, as input, a continuous movement of one touch with respect to at least one touch. The touch screen may transmit user input information corresponding to a continuous movement of an input touch, to the first controller 170.

According to exemplary embodiments of the present invention, a touch is not limited to the touch of the user's body or the input means enabling a touch on the touch screen, but may include a non-contact touch (e.g., a detectable distance between the touch screen and the user's body or the input means enabling a touch is less than or equal to a predefined distance such as, for example, 1 mm). The touch screen may employ a touch screen technology, such as a resistive technology, a capacitive technology, an infrared technology, an acoustic wave technology, or the like.

The first memory 120 may store applications for various functions such as a navigation function, a video call function, and a game function; databases related to images, user information, documents, fingerprint information/data, and a table of mapping a fingerprint to a function for providing a Graphical User Interface (GUI) related to the applications; background images (e.g., a menu screen image and a standby screen image) or operating programs which are required to drive the mobile terminal 100; images captured by the camera; and the like. The first memory 120 is a medium readable by a machine (e.g., a computer), or a machine-readable medium. The term "machine-readable medium" can be defined as a medium which provides data to the machine in order to enable the machine to perform a particular function. The machine-readable medium may be a storage medium. The first memory 120 may include a non-volatile medium and a volatile medium. All of these mediums must be of a type which may be detected by a physical instrument which causes instructions delivered by the mediums to be read into the machine. The first memory 120 may be non-transitory computer-readable storage medium.

The machine-readable medium is not limited to this configuration. Accordingly, the machine-readable medium includes at least one of a floppy disk, a flexible disk, a hard disk, a magnetic tape, a Compact Disc Read-Only Memory (CD-ROM), an optical disk, a punch card, a paper tape, a Random Access Memory (RAM), a Programmable Read-Only Memory (PROM), an Erasable PROM (EPROM), a flash-EPROM, and the like.

The first controller 170 executes an application according to user input information, and the application performs a program operation according to the user input information. In this case, the user input includes input through the keypad, the touch screen or the like, and/or a camera-based input. The first controller 170 may include a bus for information exchange and a processor connected to the bus in order to process information. The first controller 170 may also include a Random Access Memory (RAM) connected to the bus in order to store information required by the processor. The RAM may be used to store temporary information required by the processor. The mobile terminal 100 may further include a ROM which is connected to the bus in order to store static information required by the processor. The first controller 170 which is a Central Processing Unit (CPU), controls an overall operation of the mobile terminal 100, and serves to perform a method for guiding a route according to an exemplary embodiment of the present invention.

Figure 2:
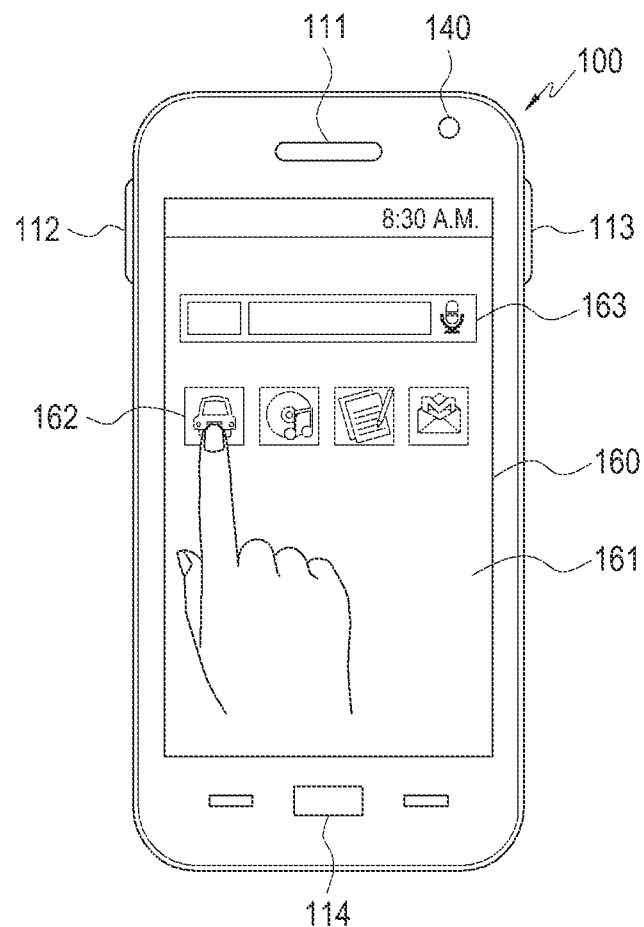
FIG. 2 schematically illustrates an outer configuration of a mobile terminal according to an exemplary embodiment of the present invention.

FIG. 2 schematically illustrates an outer configuration of a mobile terminal according to an exemplary embodiment of the present invention.

Referring to FIG. 2, the mobile terminal 100 includes the display unit 160 disposed on a front surface of the mobile terminal 100, a speaker 111 and the camera 140 which are disposed at an upper part of the display unit 160 or which are disposed on an upper part of the front surface, and a home button 114 disposed at a lower part of the display unit 160. A volume button 112 may be disposed on one lateral surface of the mobile terminal 100, and a power button 113 may be disposed on the other lateral surface thereof.

The first memory 120 of the mobile terminal 100 stores a navigation application 162 and a voice recognition application 163. The mobile terminal 100 displays applications (e.g., a navigation application, a memo application, and the like), such as the navigation application 162 and the voice recognition application 163, on a screen 161 of the display unit 160, in the form of executable icons. When the user executes a navigation application 162 on a touch command or a voice command, the mobile terminal 100 communicates with the server 200, and operates the camera 140 in the case of a preview mode.

The first controller 170 of the mobile terminal 100 includes a view selector 180 for selecting one of a preview mode of using an image captured by the camera 140 as a real-time map and a street view mode of using a street view image received from the server 200 as a map. In addition, the first controller 170 of the mobile terminal 100 includes a virtual object synthesizer 190 for displaying route guide information on a preview image or a street view image.

The server 200 includes a second communication unit 210, a second memory 220, and a second controller 240.

The second communication unit 210 performs wired or wireless communication with the mobile terminal 100.

The second memory 220 includes a street view panorama database (hereinafter, a database) 230, and the database 230 includes multiple different locations and mapped street view images. The database 230 is a map database, and stores a three-dimensional (3D) actual image map generated by using actual images of a city or a street that a camera has captured. The term "3D actual image map" refers to a 3D map implemented by using captured actual images after an actual street is captured by using a vehicle or an airplane. In the case of the 3D actual image map, a city or a street is captured by a stereo camera mounted on the vehicle, and thus it is possible to obtain not only three-dimensional coordinates (e.g., x-axis, y-axis and z-axis coordinates) of each of objects included in a captured image, but also depth information corresponding to a distance between the stereo camera, which has been used to capture the city or street, and each of the objects. Otherwise, the 3D actual image map may be implemented by capturing multiple two-dimensional (2D) images of a wide area by using the airplane, by extracting depth information in an area in which two adjacent 2D images among the captured images overlap, and by performing 3D modeling through 3D mapping. In addition, each object included in the 3D actual image map has multiple pieces of 3D information and multiple pieces of depth information. For example, each of multiple pixels representing each of the objects may have 3D information and depth information. Accordingly, the 3D actual image map may be used to distinguish not only the location of a particular building but also the outline of the particular building, such as the front surface, the rear surface, and the lateral surfaces thereof, from those of another building. Further, the 3D actual image map may be used to distinguish between floors of the particular building. In contrast, in an existing 2D map, only GPS information is used, and thus the existing 2D map provides only location information on the particular building. In this regard, the existing 2D map differs from the 3D actual image map in that the existing 2D map may not specifically distinguish between the front surface and the rear surface of the particular building or the existing 2D map may not specifically distinguish between floors thereof.

The second controller 240 includes a location measurement unit 250. The location measurement unit 250 matches a preview image received from the mobile terminal 100 with each of street view images stored in the database 230, and generates route guide information corresponding to the matched street view image. In other words, the second controller 240 searches for a street view image, which matches the preview image, from street view images stored in the database 230. At this time, the location measurement unit 250 can improve a matching speed and an accuracy by using location information received from the mobile terminal 100. The database 230 stores street view information, which includes a location, an attitude (or bearing, or direction), and the like which correspond to each of street view images, as well as the street view images.

The second memory 220 may store a program including instructions which cause the mobile terminal 100 to perform a preset method for guiding a route, and update information of the program, and the like. The second controller 240 may perform a control operation for transmitting the relevant program to the mobile terminal 100, at a request from the mobile terminal 100 or automatically.

Figure 3:
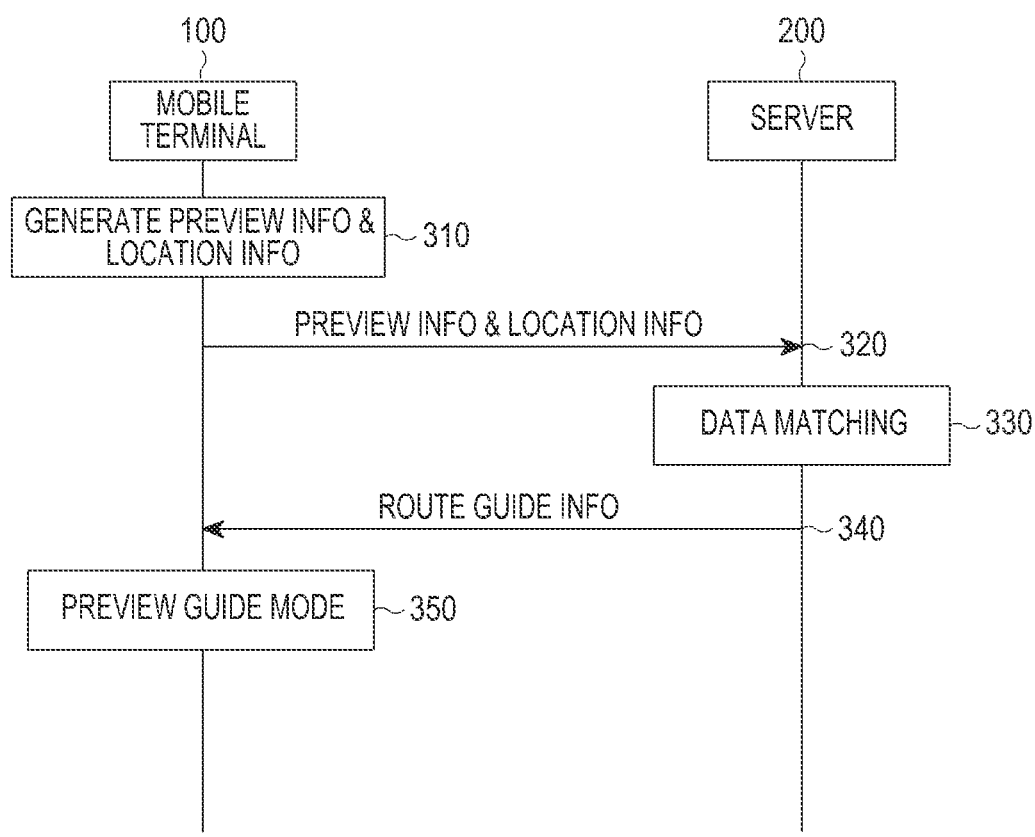
FIG. 3 is a signal flow diagram illustrating a method for guiding a route according to a first exemplary embodiment of the present invention.

FIG. 3 is a signal flow diagram illustrating a method for guiding a route according to a first exemplary embodiment of the present invention.

Referring to FIG. 3, the first exemplary embodiment of the present invention describes an example in which a navigation application operates in a preview mode.

In step 310, the first controller 170 of the mobile terminal 100 generates preview information (e.g., a preview image) by using the camera 140, and generates location information by using the sensor unit 130. The location information may include some or all of sensor values, such as a GPS location provided by the GPS sensor, a bearing (or an attitude, or a direction) provided by the compass sensor, and an angular velocity provided by the gyro sensor.

In step 320, the first controller 170 transmits the preview information and the location information to the server 200 by using the first communication unit 150.

In step 330, the second controller 240 matches preview information received from the mobile terminal 100 with street view information (e.g., a street view image) stored in the database 230, and generates route guide information corresponding to the matched street view information. The route guide information includes some or all of a part (e.g., location and bearing information) of the matched street view information, Point Of Interest (POI) information which represents information on a point of interest, and route information such as a distance, a direction, a location, and the like.

In step 340, the server 200 transmits the route guide information to the mobile terminal 100 by using the second communication unit 210. For example, the server 200 may communicate with the mobile terminal 100 by using a message. In step 340, the server 200 may include an identifier indicating whether matching is successful, in the route guide information, and may transmit the route guide information including the identifier, to the mobile terminal 100.

In step 350, the first controller 170 executes a preview guide mode. Specifically, the first controller 170 generates at least one virtual object based on the route guide information, and synthesizes the virtual object with a preview image and displays the virtual object synthesized with the preview image, to a user by using the display unit 160. The virtual object includes at least one of a first route guide object such as an arrow, a second route guide object representing a distance and a location, a POI object, and the like. At this time, each object may be displayed two-dimensionally or three-dimensionally (namely, perspectively). The first controller 170 may realistically and accurately express the first route guide object and the POI object by using location and/or bearing information included in the route guide information. When the first route guide object is generated by using only location information (GPS location and bearing) measured by the mobile terminal 100, the first route guide object may not accurately match the preview image, but may seem to be floating on the road. Therefore, a problem arises in that there may occur a case in which the user is guided to an incorrect road in a complicated downtown area. The route guide information includes location and bearing information of a street view image captured while a vehicle is travelling on the actual road. Accordingly, when the location and bearing information is used, the first route guide object may accurately match the preview image. Similarly, a POI object may accurately match a natural feature on the earth. The first controller 170 may transparently or opaquely overlay the preview image with the virtual object. This configuration is described in terms of a layer structure as follows. The first controller 170 may dispose a 3D layer, which has the transparent or opaque virtual object with a transparent background, on the preview image layer.

Figure 4:
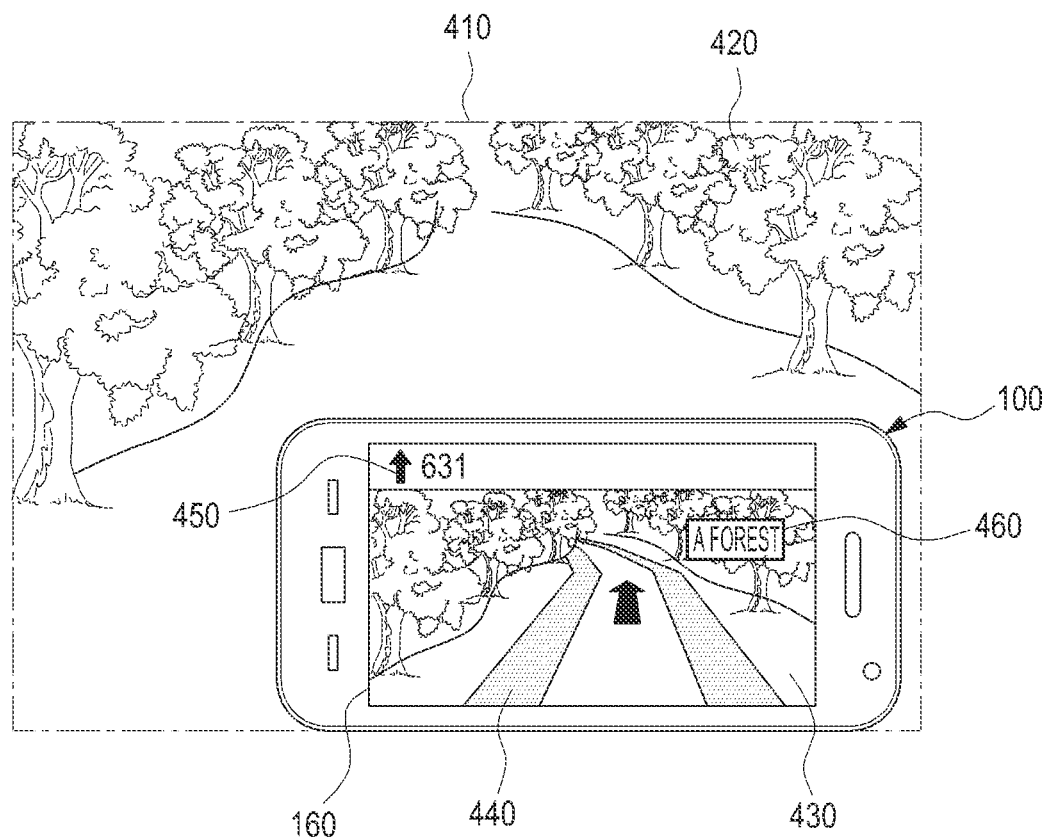
FIG. 4 is a view for explaining a method for guiding a route according to a first exemplary embodiment of the present invention.

FIG. 4 is a view for explaining a method for guiding a route according to a first exemplary embodiment of the present invention.

Referring to FIG. 4, a mobile terminal mounted in a vehicle front window is illustrated.

As illustrated in FIG. 4, the display unit 160 of the mobile terminal 100 displays a preview image 430, which the camera 140 is currently capturing, and also displays route guide information on the preview image 430. The route guide information is displayed in such a manner so as to overlap a road in the preview image 430, and is displayed in such a manner as to overlap a first route guide object 440, which displays a heading route as an image, and an upper part of the preview image 430. In addition, the route guide information includes a second route guide object 450 indicating a distance to an intersection and a heading direction at the intersection, and a POI object 460 representing detailed information such as names and the number of floors of natural features on the earth such as buildings, roads, forests, and the like in the preview image 430. According to exemplary embodiments of the present invention, the POI object 460 may be displayed by text, by an image, and the like.

As illustrated in FIG. 4, through a vehicle front window 410, a surrounding environment 420 including a forest and the road in the forest is shown, and the display unit 160 of the mobile terminal 100 also identically (or substantially identically) displays a part of the surrounding environment limited by a viewing angle of the camera 140.

Figure 5:
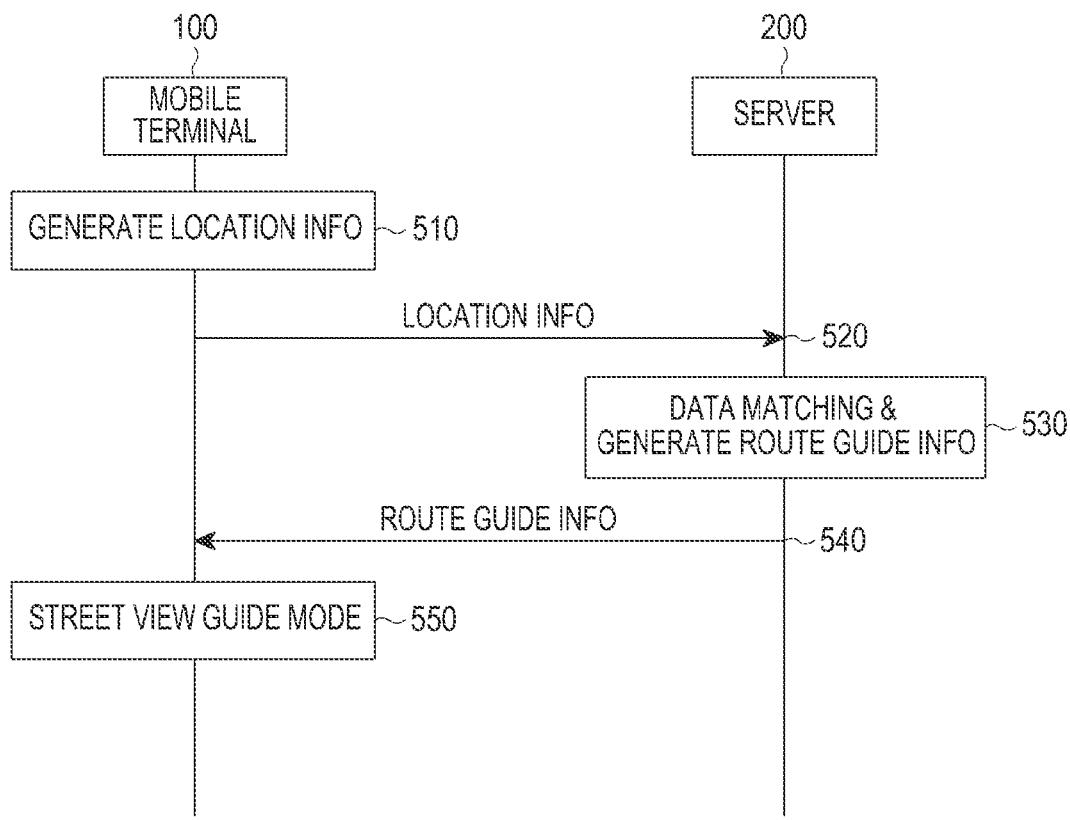
FIG. 5 is a signal flow diagram illustrating a method for guiding a route according to a second exemplary embodiment of the present invention.

FIG. 5 is a signal flow diagram illustrating a method for guiding a route according to a second exemplary embodiment of the present invention.

Referring to FIG. 5, the second exemplary embodiment of the present invention describes an example in which a navigation application operates in a street view mode.

In step 510, the first controller 170 of the mobile terminal 100 generates location information by using the sensor unit 130. The location information may include some or all of sensor values, such as a GPS location provided by the GPS sensor, a bearing (or an attitude, or a direction) provided by the compass sensor, an angular velocity provided by the gyro sensor, and the like.

In step 520, the first controller 170 transmits the location information to the server 200. The mobile terminal 100 may transmit the location information by using the first communication unit 150.

In step 530, the second controller 240 matches location information received from the mobile terminal 100 with street view information (e.g., a street view image) stored in the database 230, and generates route guide information corresponding to the matched street view information. The route guide information includes some or all of a part of (e.g., a street view image and bearing information) the matched street view information, POI information which represents information on a POI, and route information such as a distance, a direction, a location, and the like.

In step 540, the server 200 transmits the route guide information to the mobile terminal 100 by using the second communication unit 210. As an example, the server 200 may communicate with the mobile terminal 100 by using a message. In step 540, the server 200 may include an identifier indicating whether matching is successful, together with the route guide information, in a message, and may transmit the message, which includes the identifier together with the route guide information, to the mobile terminal 100.

In step 550, the first controller 170 executes a street view guide mode. Specifically, the first controller 170 generates at least one virtual object based on the route guide information, synthesizes the virtual object with a street view image and displays the virtual object synthesized with the street view image, to a user by using the display unit 160. The virtual object includes at least one of a first route guide object such as an arrow, a second route guide object representing a distance and a location, and a POI object. At this time, each object may be displayed two-dimensionally or three-dimensionally (namely, perspectively). The first controller 170 may transparently or opaquely overlay the street view image with the virtual object. This configuration is described in terms of a layer structure as follows. The first controller 170 may dispose a 3D layer, which has the transparent or opaque virtual object with a transparent background, on the street view image layer.

Figure 6:
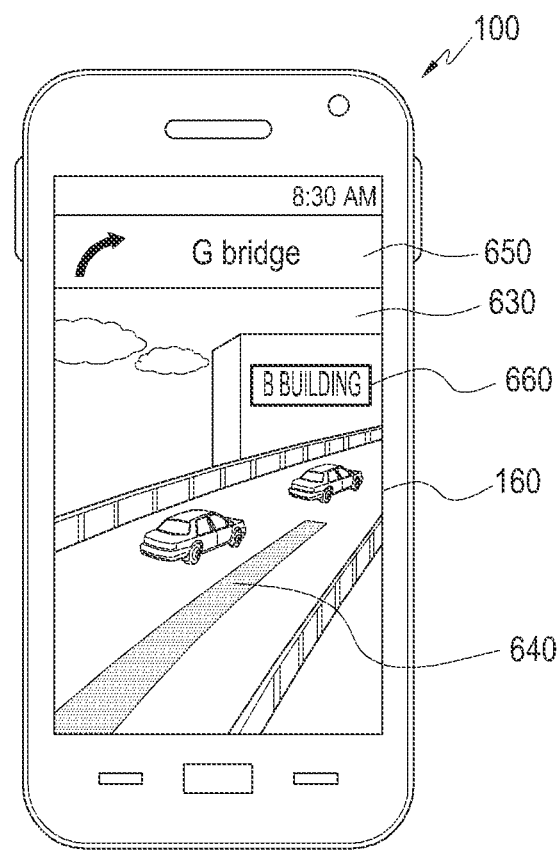
FIG. 6 is a view for explaining a method for guiding a route according to a second exemplary embodiment of the present invention.

FIG. 6 is a view for explaining a method for guiding a route according to a second exemplary embodiment of the present invention.

Referring to FIG. 6, the display unit 160 of the mobile terminal 100 displays both a street view image 630 pre-stored in the server 200 and route guide information displayed on the street view image 630, before a navigation application is executed. The route guide information is displayed in such a manner as to overlap a road in the street view image 630, and is displayed in such a manner as to overlap a first route guide object 640, which displays a heading route as an image, and an upper part of the street view image 630. In addition, the route guide information includes a second route guide object 650 indicating a distance to an intersection and a heading direction at the intersection, and a POI object 660 representing detailed information such as names and the number of floors of natural features on the earth such as buildings, roads, forests, and the like in a preview image. The POI object 660 may be displayed by text, by an image, and the like.

When the mobile terminal 100 is mounted in the vehicle front window, in a surrounding environment seen through the vehicle front window and the street view image 630 displayed by the display unit 160 of the mobile terminal 100, natural features on the earth, which are fixed, coincide with each other, but moving objects such as vehicles and clouds may appear differently from each other.

Figure 7:
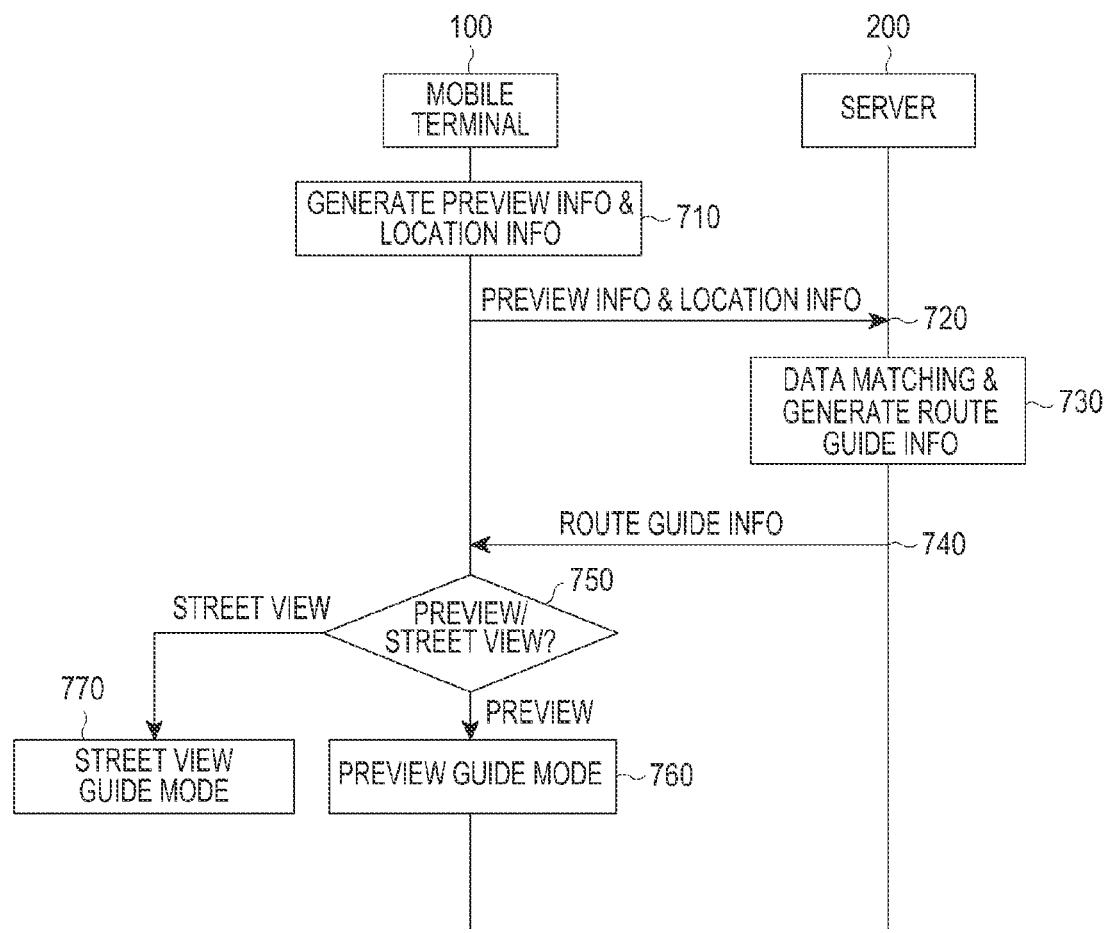
FIG. 7 is a signal flow diagram illustrating a method for guiding a route according to a third exemplary embodiment of the present invention.

FIG. 7 is a signal flow diagram illustrating a method for guiding a route according to a third exemplary embodiment of the present invention.

Referring to FIG. 7, steps 710 to 740 which have been described with reference to FIG. 3 are identical to steps 310 to 340, and thus will not be described below.

In step 750, the first controller 170 of the mobile terminal 100 analyzes route guide information received from the server 200, and determines a route guide mode. For example, the first controller 170 may identify an identifier indicating whether matching is successful, which is included in the route guide information, or may identify whether a street view image is included in the route guide information. When the matching is successful or when the street view image is not included in the route guide information, the first controller executes a preview guide mode in step 760. When the matching fails or when the street view image is included in the route guide information, the first controller executes a street view guide mode in step 770. The failure of the matching may occur when a time point of building the database 230 differs from that of a preview image received from the mobile terminal 100, when a preview image is captured against the light, when a preview image is captured at night, when multiple obstacles block a visual field of the camera 140, or the like.

Figure 8:
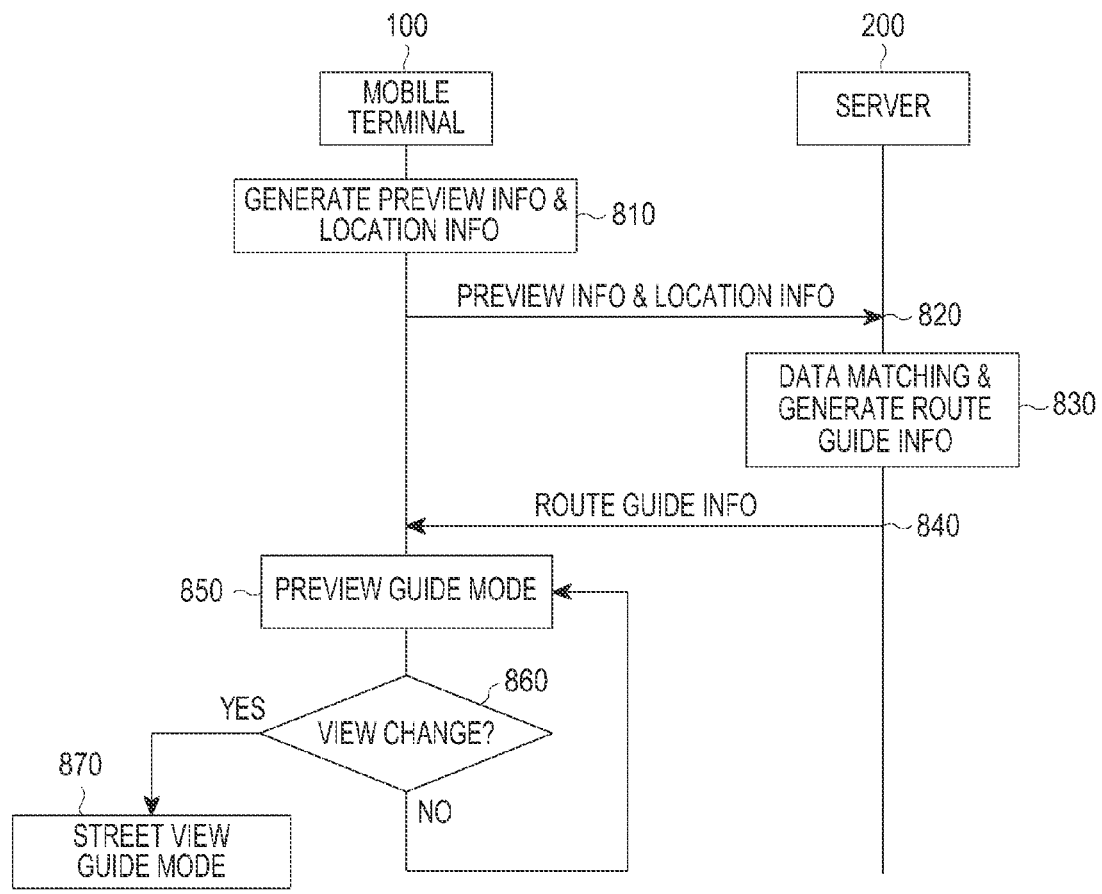
FIG. 8 is a signal flow diagram illustrating a method for guiding a route according to a fourth exemplary embodiment of the present invention.

FIG. 8 is a signal flow diagram illustrating a method for guiding a route according to a fourth exemplary embodiment of the present invention.

Referring to FIG. 8, steps 810 to 850 are identical to steps 310 to 350 which have been described with reference to FIG. 3, and thus will not be described below.

In step 860, the first controller 170 of the mobile terminal 100 identifies whether a view change event occurs. The view change event occurs when a user inputs a view change command by using a user interface or the display unit, or when preset conditions stored in the first memory 120 are satisfied. Referring to FIG. 4, for example, the user touches an optional position, a preset area or a provided button on the screen of the display unit 160 in a state in which a preview mode is being executed, and allows the mobile terminal 100 to change from the preview mode to the street view mode.

Because a preview image is an image currently captured by the camera 140, it is impossible to previously search for a route in the preview mode. In this case, the user, for example, drags his/her finger downwards on the screen 161 of the display unit 160, and allows the mobile terminal 100 to change to a street view enabling preview. In addition, the user may desire an environment in which there are no people, in an area in which many people are crowded. In this case, the user allows the mobile terminal to change to a street view.

The preset conditions may include a case in which the strength of a satellite signal provided by the sensor unit 130 is less than a preset threshold value, a case in which the user enters a shadow area of a satellite signal such as a tunnel and a jamming area, and the like.

When the view change event does not occur, the first controller 170 executes a preview guide mode in step 860.

When the view change event occurs, the first controller 170 executes a street view guide mode in step 870.

According to the fourth exemplary embodiment of the present invention, a case has been described as an example in which the mobile terminal 100 changes from the preview guide mode to the street view guide mode. In contrast, depending on the occurrence of a view change event, the mobile terminal 100 may change from the street view guide mode to the preview guide mode.

In addition, according to the first to fourth exemplary embodiments of the present invention, a case has been described as an example where in which the route of the vehicle is guided. However, the method for guiding a route as described above can also be applied to a case in which the user moves on foot, or the like.

In addition, according to the first to fourth exemplary embodiments of the present invention, a case has been described as an example in which the mobile terminal 100 receives route guide information from the server 200. However, when the first memory 120 of the mobile terminal 100 includes a street view database, route guide information may be generated by the mobile terminal 100. For example, referring to FIG. 3, the mobile terminal 100 may perform step 330 performed by the server 200.

According to the first to fourth exemplary embodiments of the present invention, a camera preview mixed with a street view is used for AR navigation, so that it is possible to stably cope with a case in which preview-based localization fails. In addition, a preview function is provided to the user, or AR experience is provided together with an image having much higher visibility in an area in which many people are crowded, so that high use experience can be provided in terms of a user interface.

It will be appreciated that the exemplary embodiments of the present invention may be implemented in the form of hardware, software, or a combination of hardware and software. Any such software may be stored in a volatile or non-volatile storage device such as a Read-Only Memory (ROM), or in a memory such as a Random Access Memory (RAM), a memory chip, a memory device or a memory integrated circuit, or in a storage medium, such as a Compact Disc (CD), a Digital Versatile Disc (DVD), a magnetic disk or a magnetic tape, which is optically or magnetically recordable and simultaneously, is readable by a machine (e.g., a computer), regardless of whether the software can be deleted or rewritten. It will be appreciated that the memory which may be included in the mobile terminal is an example of a machine-readable storage medium suitable for storing a program or programs including instructions for implementing the exemplary embodiments of the present invention. Accordingly, exemplary embodiments of the present invention include a program including codes for implementing an apparatus or a method claimed in any claim of this specification, and a non-transitory machine-readable storage medium which stores this program therein. In addition, this program may be electronically conveyed via any medium such as a communication signal transmitted through a wired or wireless connection, and the present invention suitably includes equivalents of this program.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for providing navigation information by a mobile terminal, the method comprising:
    generating, by the mobile terminal, a preview image captured by a camera and location information of the mobile terminal;
    transmitting, by the mobile terminal, the preview image and location information to a server;
    receiving, by the mobile terminal, route guide information generated based on the preview image and the location information, from the server;
    generating, by the mobile terminal, at least one virtual object based on the route guide information;
    synthesizing, by the mobile terminal, the at least one virtual object with an image; and
    displaying, by the mobile terminal, the route guide information to a user.

2. The method as claimed in claim 1, wherein the image with which the at least one virtual object is synthesized corresponds to the preview image, and
    wherein the displaying of the route guide information comprises:
        displaying, by the mobile terminal, the at least one virtual object synthesized with the preview image to the user.

3. The method as claimed in claim 1, wherein the image with which the at least one virtual object is synthesized corresponds to a street view image, and
    wherein the displaying of the route guide information comprises:
        displaying, by the mobile terminal, the at least one virtual object synthesized with the street view image to the user.

4. The method as claimed in claim 1, further comprising:
    analyzing, by the mobile terminal, the route guide information received from the server; and
    determining, by the mobile terminal, a route guide mode among a plurality of route guide modes.

5. The method as claimed in claim 4, further comprising:
determining, by the mobile terminal, whether a view change event occurs; and
changing, by the mobile terminal, the determined route guide mode to another route guide mode when the view change event occurs.

6. A non-transitory machine-readable storage medium which stores a program for executing a method for providing navigation information, the method comprising:
generating, by the mobile terminal, a preview image captured by a camera and location information of the mobile terminal;
transmitting, by the mobile terminal, the preview image and location information to a server;
receiving, by the mobile terminal, route guide information generated based on the preview image and the location information, from the server;
generating, by the mobile terminal, at least one virtual object based on the route guide information;
synthesizing, by the mobile terminal, the at least one virtual object with an image; and
displaying, by the mobile terminal, the route guide information to a user.

7. A method for providing navigation information by a server, the method comprising:
receiving, by the server, a preview image captured by the mobile terminal and location information of the mobile terminal, from the mobile terminal;
matching, by the server, the preview image with a pre-stored street view image;
generating, by the server, route guide information based on location and direction information related to the matched street view image; and
transmitting, by the server, the route guide information, from which at least one virtual object is generated and synthesized with an image, to the mobile terminal.

8. The method as claimed in claim 7, wherein the route guide information comprises:
the location and direction information related to the matched street view image;
Point Of Interest (POI) information corresponding to information on a point of interest; and
route information.

9. The method as claimed in claim 7, wherein the route guide information comprises:
location and direction information; and
a street view image.

10. The method as claimed in claim 7, wherein the route guide information further comprises an identifier indicating whether the matching is successful.

11. The method as claimed in claim 7, further comprising:
generating, by the server, route guide information comprising location and direction information and a street view image when the matching fails; and
transmitting, by the server, the generated route guide information when the matching fails, to the mobile terminal.

12. A mobile terminal for navigation, the mobile terminal comprising:
a camera which captures a preview image;
a sensor unit which generates location information of the mobile terminal;
a communication unit which transmits the preview image and the location information to a server; and
a controller which controls the communication unit to receive route guide information generated based on the preview image and the location information from the server, which generates at least one virtual object based on the route guide information, which synthesizes the at least one virtual object with an image, and which controls a display unit to display the route guide information to a user.

13. The mobile terminal as claimed in claim 12, wherein the image with which the at least one virtual object is synthesized corresponds to the preview image, and
wherein the controller displays the at least one virtual object synthesized with the preview image to the user.

14. The mobile terminal as claimed in claim 12, wherein the image with which the at least one virtual object is synthesized corresponds to a street view image, and
wherein the controller displays the at least one virtual object synthesized with the street view image to the user.

15. The mobile terminal as claimed in claim 12, wherein the controller analyzes the route guide information received from the server, and determines a route guide mode among a plurality of route guide modes.

16. The mobile terminal as claimed in claim 15, wherein the controller determines whether a view change event occurs, and changes the determined route guide mode to another route guide mode when the view change event occurs.

17. A server which provides navigation information to a mobile terminal, the server comprising:
a communication unit which receives, from the mobile terminal, a preview image captured by the mobile terminal and location information of the mobile terminal;
a memory which stores street view images; and
a controller which searches for a street view image matching the preview image from the street view images, which generates route guide information based on location and direction information related to the matched street view image, and which controls the communication unit to transmit the route guide information, from which at least one virtual object is generated and synthesized with an image, to the mobile terminal.

18. The server as claimed in claim 17, wherein the route guide information comprises:
the location and direction information related to the matched street view image;
Point Of Interest (POI) information corresponding to information on a point of interest; and
route information.

19. The server as claimed in claim 17, wherein, when the matching fails, the controller generates route guide information comprising location and direction information and a street view image, and controls the communication unit to transmit the generated route guide information to the mobile terminal.

* * * * *